United States Patent
Di Balsamo et al.

(10) Patent No.: US 9,400,687 B2
(45) Date of Patent: *Jul. 26, 2016

(54) METHOD AND SYSTEM FOR DYNAMIC POOL REALLOCATION

(71) Applicant: International Business Machines Corporation, Armonk, NY (US)

(72) Inventors: Arcangelo Di Balsamo, Aprilia (IT); Sandro Piccinini, Rome (IT); Luigi Presti, L'Aquila (IT); Luigi Schiuma, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/567,339

(22) Filed: Dec. 11, 2014

(65) Prior Publication Data

US 2016/0170800 A1    Jun. 16, 2016

(51) Int. Cl.
  *G06F 9/46* (2006.01)
  *G06F 9/48* (2006.01)
  *G06F 9/50* (2006.01)

(52) U.S. Cl.
  CPC ............ *G06F 9/4887* (2013.01); *G06F 9/5005* (2013.01)

(58) Field of Classification Search
  CPC .................................................... G06F 9/4887
  USPC ................................................ 718/101–108
  See application file for complete search history.

(56) References Cited

U.S. PATENT DOCUMENTS 5,444,632 A * 8/1995 Kline ............... G05B 19/41865
                                                           257/E21.525
5,963,911 A    10/1999 Walker et al.
(Continued)

FOREIGN PATENT DOCUMENTS

WO    2012028213 A1    3/2012

OTHER PUBLICATIONS

Zhang, Qi, Quanyan Zhu, and Raouf Boutaba. "Dynamic resource allocation for spot markets in cloud computing environments." Utility and Cloud Computing (UCC), 2011 Fourth IEEE International Conference on. IEEE, 2011, pp. 178-185.*

(Continued)

*Primary Examiner* — Satish Rampuria
(74) *Attorney, Agent, or Firm* — David B. Woycechowsky

(57) ABSTRACT

Dynamic pool reallocation performed by the following steps: (i) defining a plurality of resource pools including a first pool and a second pool, where each resource pool has a plurality of assigned resources; (ii) receiving a plurality of jobs to be executed; (iii) for each job of the plurality of jobs, assigning a respective resource pool, of the plurality of resource pools, to be used in completing the job; (iv) determining a preliminary schedule for executing the jobs on their respective resource pools; (v) determining whether the preliminary schedule will cause any jobs to miss service level agreement (SLA) deadlines corresponding to the job; (vi) executing the plurality of jobs on their respectively assigned resource pools; and (vii) re-assigning first resource from the second pool to the first pool during at least some of the time of the execution of the first job by the first resource pool.

2 Claims, 5 Drawing Sheets

(56) References Cited

U.S. PATENT DOCUMENTS

| | | | |
|---|---|---|---|
| 6,816,882 B1* | 11/2004 | Conner | G06F 21/121 709/203 |
| 7,302,450 B2 | 11/2007 | Benedetti et al. | |
| 8,099,411 B2 | 1/2012 | Richards et al. | |
| 8,156,502 B1 | 4/2012 | Blanding | |
| 8,255,915 B1 | 8/2012 | Blanding et al. | |
| 8,312,460 B1 | 11/2012 | Blanding | |
| 2002/0194248 A1* | 12/2002 | Wood | G06F 9/5038 718/102 |
| 2005/0144234 A1 | 6/2005 | Tanaka et al. | |
| 2008/0271039 A1* | 10/2008 | Rolia | G06Q 10/06 718/105 |
| 2009/0025004 A1 | 1/2009 | Barnard et al. | |
| 2012/0096468 A1 | 4/2012 | Chakravorty et al. | |
| 2012/0131591 A1* | 5/2012 | Moorthi | G06Q 30/00 718/104 |
| 2012/0317578 A1 | 12/2012 | Kansal et al. | |

OTHER PUBLICATIONS

Korkhov, Vladimir V., Jakub T. Moscicki, and Valeria V. Krzhizhanovskaya. "Dynamic workload balancing of parallel applications with user-level scheduling on the Grid." Future Generation Computer Systems 25.1 (2009): pp. 28-34.*

Gmach, Daniel, Jerry Rolia, and Lucy Cherkasova. "Satisfying service level objectices in a self-managing resource pool." Self-Adaptive and Self-Organizing Systems, 2009. SASO'09. Third IEEE International Conference on. IEEE, 2009, pp. 243-253.*

Sharafeh et al., "An SLA Negotiation Strategy for Scheduling in Grid", 20th Iranian Conference on Electrical Engineering, (ICEE2012), May 15-17, 2012, Tehran, Iran, pp. 794-799.

Singh et al., "Performance Comparisons and Scheduling of Load Balancing Strategy in Grid Computing", 2011 International Conference on Emerging Trends in Networks and Computer Communications (ETNCC), Apr. 22-24, 2011, pp. 438-443, DOI: 10.1109/ETNCC.2011.6255939, 978-1-4577-0239-6.

Appendix P—List of IBM Patents or Patent Applications Treated as Related.

U.S. Appl. No. 14/843,065 entitled "Methods and System for Dynamic Pool Reallocation", filed Sep. 2, 2015.

* cited by examiner

METHOD AND SYSTEM FOR DYNAMIC POOL REALLOCATION

BACKGROUND OF THE INVENTION

The present invention relates generally to the field of workload management, and more particularly to dynamic pool allocation in workload management.

Workload management is the process of controlling the access to system resources for the work executing on a set of computer resources (for example, a mainframe computer). On a typical set of computer resources, many different applications execute at the same time. Typically, work management attempts to accomplish objectives such as the following: (i) execute work with consistent execution times; and/or (ii) allow predictable access to databases. In some work management systems, a system administrator classifies work into service classes. The classification mechanism uses work attributes like transaction names, user identifications or program names which specific applications are known to use. In addition, the system administrator defines goals and importance levels for the service classes representing the application work. The goals define performance expectations for the work. Goals can be expressed as response times, a relative speed (termed velocity) or as discretionary if no specific requirement exists.

A typical problem when dealing with workload management is to keep the expected deadlines for jobs that are critical for the business. For instance, a bank must be sure to process payment orders by a given date. It happens very frequently that critical jobs share the same resources as non-critical ones, for instance, the payment order process can share the same resources of another process for printing statistical reports that are not subject to any particular constraint in time. If the workload scheduling infrastructure caused the job to start according to the user's defined schedule, it could happen that the non-critical reporting process is scheduled to start earlier than the critical payment orders process (for instance, reporting is scheduled to start at 10.00 AM and order processing at 10.30 AM. In this case, the reporting process "steals" resources that could be better used to complete the order processing on time.

SUMMARY

According to an aspect of the present invention, there is a method, computer program product and/or system that performs the following steps (not necessarily in the following order): (i) defining a plurality of resource pools including a first pool and a second pool, where each resource pool has a plurality of assigned resources; (ii) receiving a plurality of jobs to be executed; (iii) for each job of the plurality of jobs, assigning a respective resource pool, of the plurality of resource pools, to be used in completing the job; (iv) determining a preliminary schedule for executing the jobs on their respective resource pools; (v) determining whether the preliminary schedule will cause any jobs to miss service level agreement (SLA) deadlines corresponding to the job; (vi) executing the plurality of jobs on their respectively assigned resource pools; and (vii) on condition that a first job, of the plurality of jobs and assigned to the first resource pool, will miss an associated SLA deadline under the preliminary schedule, re-assigning first resource from the second pool to the first pool during at least some of the time of the execution of the first job by the first resource pool.

DETAILED DESCRIPTION

Figure 1:
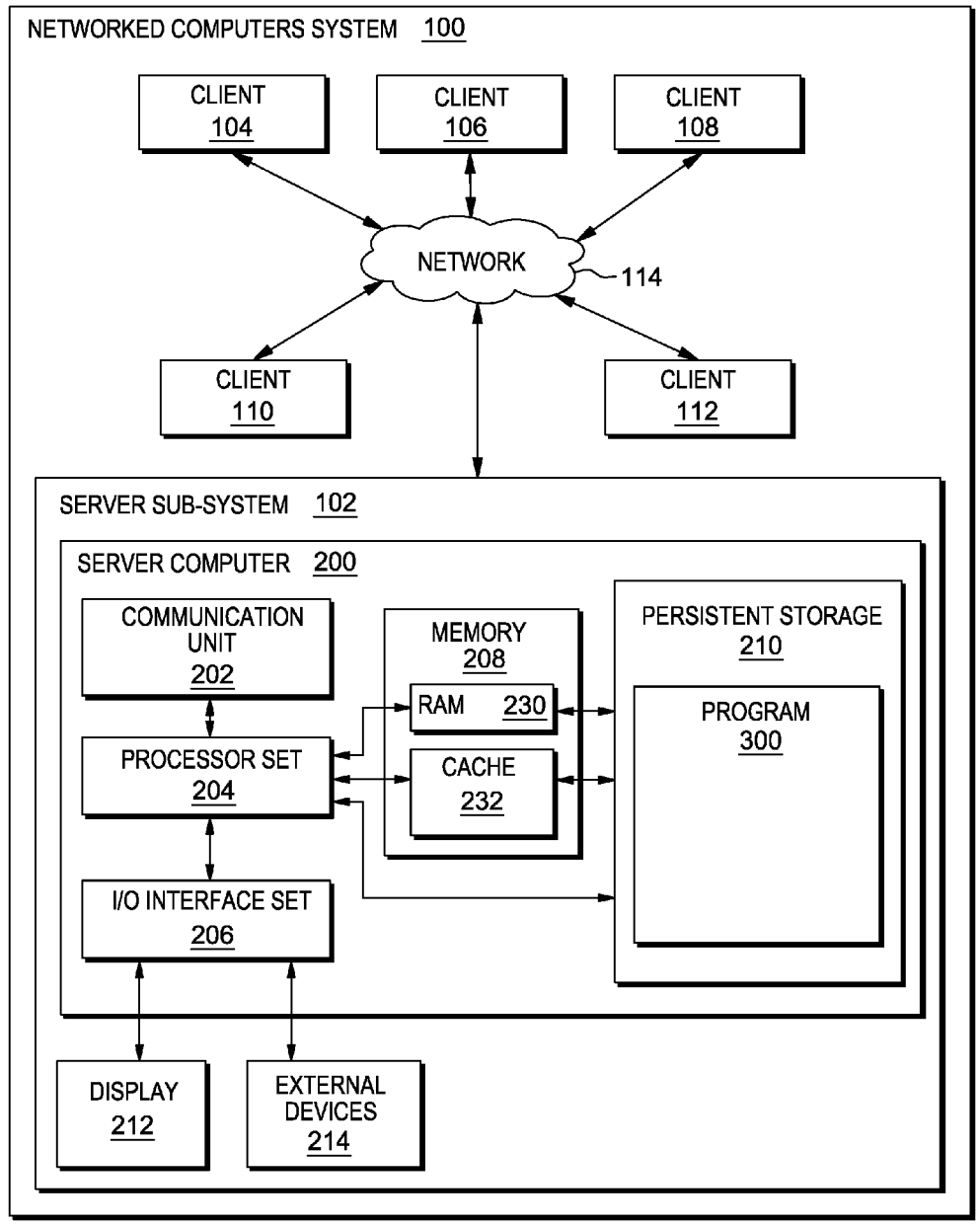
FIG. 1 is a block diagram view of a first embodiment of a work management system according to the present invention.

Some embodiments of the present invention temporarily re-assign resources from one pool to another pool to help ensure the meeting of a service level agreement (SLA). This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) device 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. EXAMPLE EMBODIMENT

Figure 2:
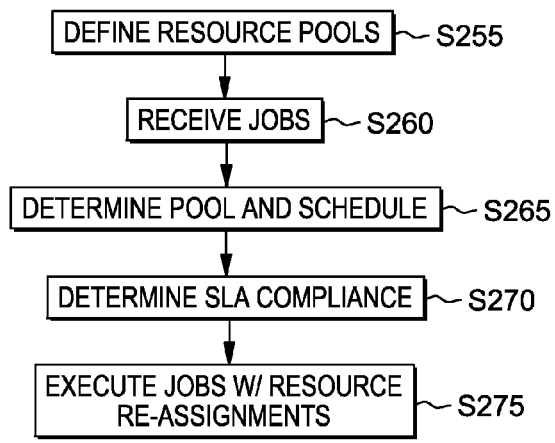
FIG. 2 is a flowchart showing a first embodiment method performed, at least in part, by the first embodiment system.
Figure 3:
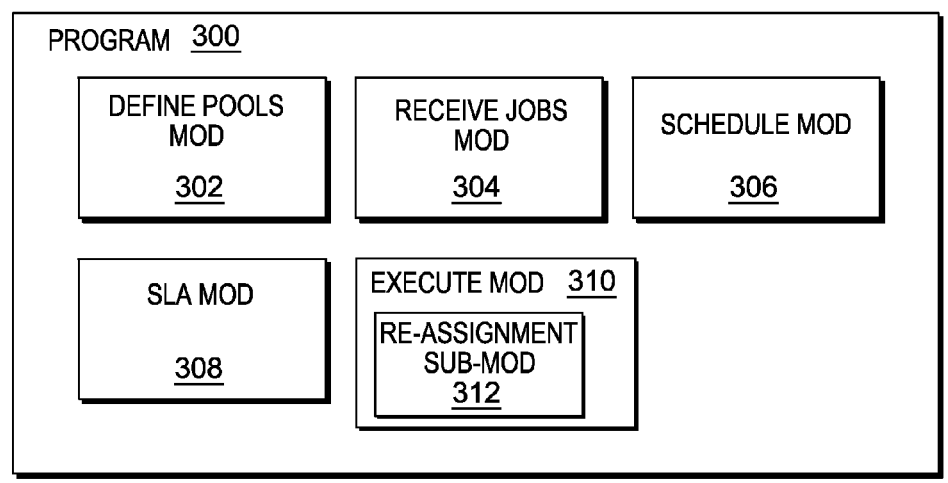
FIG. 3 is a block diagram showing a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where define pools module ("mod") 302 defines resources into a set of resource pools. The resources may include processor resources, memory resources, data storage resources, memory resources input/output (I/O) resources and/or network communication resources.

Processing proceeds to step S260, where receive jobs mod 304 receives a plurality of jobs to be executed. Although step S260 is shown, in flowchart 250, as a step occurring before the determination of scheduling, the determination of SLA compliance and the execution of the jobs themselves, it should be understood that, at least in some embodiments, the receipt of new jobs is an ongoing step that continues to occur in parallel with ongoing scheduling and re-scheduling, ongoing job execution and ongoing re-assignments of resources to facilitate timely job execution (as will be further discussed, below).

Processing proceeds to step S265, where schedule mod determines a preliminary pool assignment and a preliminary time period (that is, scheduled time) for each job that has been received.

Processing proceeds to step S270, where SLA mod 308 determines SLA compliance based upon the preliminary schedule. If there is, or are, SLA compliance issue(s), then schedule mod 306 determines an adjusted schedule based on the assumption that resources will be strategically re-assigned from one resource pool to another resource pool as the jobs are being executed. More specifically, certain jobs will have resources temporarily re-assigned to their resource pools so that they finish more quickly and allow SLAs to be complied with. These certain jobs may include: (i) jobs that are determined to be subject to an SLA compliance problem; and/or (ii) jobs that must be performed before the job with the SLA compliance issue can be executed (for example, jobs using the same resource pool as the job subject to the SLA compliance issue and are scheduled prior to the job subject to the SLA compliance issue).

Processing proceeds to step S275, where execute mode 310 executes the jobs according to the adjusted schedule on the scheduled resource pools. Any re-assignments of resources in a resource pool will be made by re-assignment sub-mod 312 during execution of the jobs. If a resource is re-assigned from one resource pool to another, some embodiments of the present invention will also re-assign the resource back to its original pool (or another pool where the resource may be helpful for SLA compliance reasons) after the job(s) causing the initial SLA compliance issues have been executed.

III. FURTHER COMMENTS AND/OR EMBODIMENTS

Some embodiments of the present invention include the following characteristics, features and/or advantages: (i) reconfigure the physical layer of a work management system to dynamically react to a specific business need; and/or (ii) evaluate if any non-critical job (sometimes also referred to as "not-critical jobs"), being started, "interferes" with running critical jobs or with critical jobs that will start after the non-critical jobs starts. The word "interfere" is based on analysis where an amount of each resource that a given job will need is estimated. Typical resources are (central processing unit) CPU usage, peak memory, bytes transferred over the networks, file system I/O (input/output), or physical resources (tape, printer, etc.). In order to have the mechanism work some embodiments include a component to estimate the duration of each job (that can be done by doing a forecast stating from the historical duration of that job stored in a database) and for each job (in similar way) estimate the amount of required resources. Based on such data the logical static definition of system groups will be updated in order to react to specific resource request affecting the successful completion of the scheduling plan.

Some embodiments may have one, or more of the following features or characteristics: (i) profiling of both job and resources based on CPU, I/O, memory, network usage; (ii) extension of the algorithm to an "independent" plan that could be executed by third-party scheduling solution on the entire system; and/or (iii) analyze both the jobs with a SLA (service level agreement) and the successors and predecessors of the job subject to the SLA.

Figure 4:
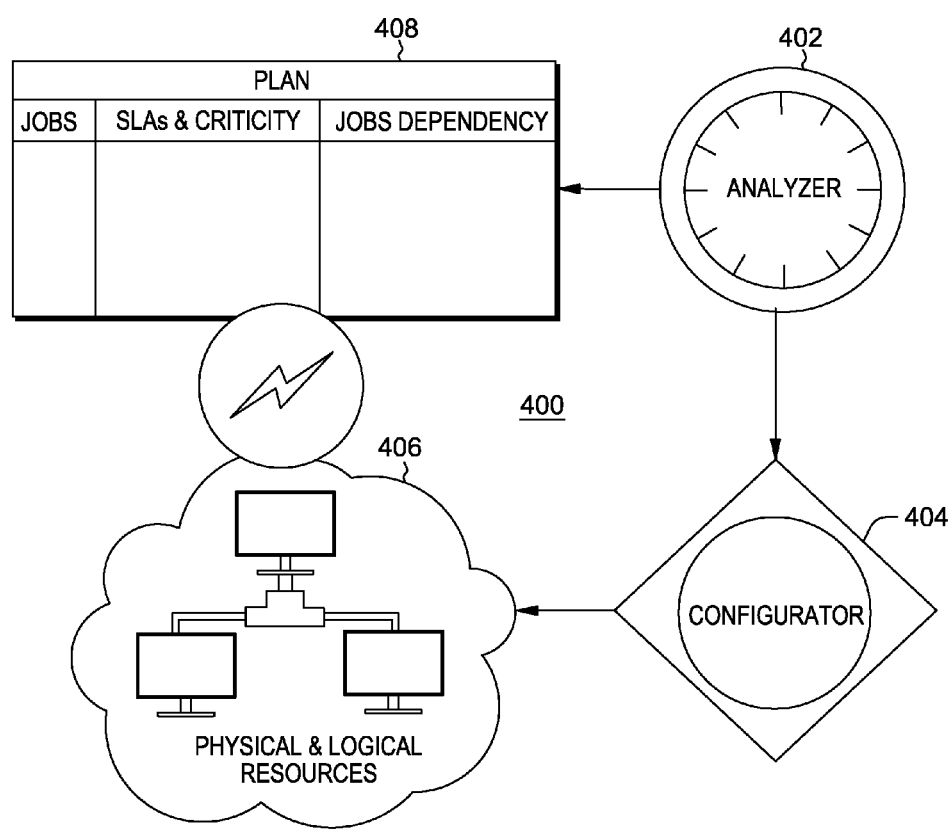
FIG. 4 is a block diagram of a second embodiment of a work management system according to the present invention.

As shown in FIG. 4, system 400 includes: analyzer block 402; configurator block 404; physical and logical resources network 406; and plan table 408. Some embodiments are based on analyzer block 402 outlining the job (see plan table 408) requiring a different level of resources to complete the plan and configurator block 404 that will be instead in charge to re-define the overall resources to react to any request from analyzer block 402. It is noted that components 402, 404 and 406: (i) may be located on the same physical and/or virtual machine; or (ii) may be distributed amongst multiple physical and/or virtual machines.

Analyzer block 402 is machine logic that monitors the plan (which it receives from plan table 408). For each job, the analyzer block will: (i) estimate the job duration; and (ii) use estimated job duration to forecast (according to a "what-if analysis") the impact of any real time change in the resources utilization (memory peaks or CPU peaks or any property likely to affect the plan). Consider an example where: (i) a specific job, JOB1, is scheduled to be run on a dynamic group, GROUP1, at time TIME1; and (ii) JOB2 is scheduled to run on GROUP2 at time TIME2. In this example, the real time data provide a forecasting (by analyzer block 402) not compliant to the SLA (see plan table 408), so a reconfiguration request is initiated toward configurator block 404. Configurator block 404 includes machine logic to dynamically redesign the plan to address the issue identified by the analyzer block.

In various embodiments of the present invention, there are different ways that configurator block can change the planned work flow so that the work flow meets applicable requirements. One simple example of this is when configurator block 404 determines that a simple change in a sequence between a critical and a not-critical job can address the issue. According to a more complex example, the solution cannot be achieved leveraging the current configuration. So, for example, if JOB1, having specific constraints on the pool destination, needs to be considered with respect to its potential impact on JOB2, but this change would affect the plan critical path, then an alternative solution is required. Another system to run JOB1 or JOB2 must be identified outside the planned "static" destination GROUP1 or GROUP2. In this example, the configurator block will introspect the JOB properties and will consider possible solutions such as the following: (i) shorten the duration using a more powerful system; and/or (ii) move one of the jobs to a different time so as not to interfere with other job. This identification may result in GROUP1 being redefined as GROUP1.1. GROUP 1.1 then acts as temporary pool to address the job criticality.

In a more complex embodiment, the algorithm must consider also all the successors of the non-critical job in order to understand if delaying the execution of a non-critical job causes jeopardy to one, or more, critical jobs that are in the successor chain of the non-critical job.

An algorithm according to the present invention can be generalized for a different "independent" plan that could run on the entire system. For instance, consider a "cloud" system provisioning provider that wants to balance and optimize the resource utilization of the system to earn as much as possible. For that reason, several resources of the system can be shared between different jobs that come from independent plans. In that case, the analyzer block could make the analysis on this different plan, also providing information about idle times of the system. Therefore, a forecast for the resources utilization is introduced. The forecast will be done for CPU, memory, network and I/O, and is based on historical statistics from the resources, taking into consideration not only jobs that the system manages but also jobs external to the system.

The configurator block (with the usual jobs/plans introspection) could also decide to decrease the "SLA" requirements of a JOB since it will not affect its duration. This may be done in order to free up resources for a "most critical job" that needs more resources to be compliant the reasons (generally SLA requirements) for its criticality. Furthermore, the new resources to provide to most critical jobs can be obtained "re-using" the idle time of other plans.

The logical flow of one process according to the present invention is as follows: (i) a plan (see plan table 408) is defined containing multiple jobs whose destination is a physical machine or a logical group of machines (see resources network 406); (iii) a change in the system(s) utilization occurs; (iv) the machine logic of analyzer block 402 determines that this change made in the previous operation will likely cause delay of a critical job and/or negative consequence(s) with respect to an operative SLA; (v) configurator block 404, based on the input from analyzer block 402, determines an appropriate modification to the logical pool definition to address the issue (this is sometimes referred to as the "profiled pan configuration"); (vi) once the critical job issue is resolved, based on the profiled plan configuration, then the original definition of pools is restored.

In this embodiment of work manager system 400, the entire plan of plan table 408 is divided into several predetermined time intervals, with a granularity that is suited to typical job running time. At the beginning of every interval, the analyzer block determines the jobs that are provisionally scheduled to run on the next time slot. This provisional scheduling will take care of the scheduled start-times, the dependencies, and the collected statistics of the job types of the provisionally scheduled jobs (for example, duration, resource utilization).

The "collected statistics" generally include information about the time and resources taken to run jobs of a given job type in the past. This historical information is shown in a history data store (not shown in FIG. 4) located in the analyzer block. The analyzer block also takes care of the forecasts for resource utilization and of the selection of a job for the next slot since it knows the jobs that will run and their statistics. In order to estimate duration and resource utilization, the analyzer block calculates forecasts for these values using a fast Fourier transform algorithm.

If a given job is subject to an SLA, or can affect directly the SLA compliance status of a later job, then the analyzer block will put that given job on a "PINK" list with the value (percentage) of delay that can be obtained for the given job without affecting any SLA.

For a given job that will run on the next time slot, analyzer block 402 checks for any SLA(s) applicable to the given job, and the SLA requirements of later jobs. If all applicable SLA requirements are likely to be satisfied by running the given job in the next time slot, then the given job is added to a "WHITE" list.

If instead the given job's SLA(s) will likely be satisfied, but an SLA requirement for a later job will not be satisfied due to the running of the given job according to the provisional schedule, then the analyzer block will determine whether the delay of the later job (that is, the delay caused by the given job) can be decreased such that the SLA requirements for the later job can be met after all. If so, the analyzer block puts onto a "YELLOW" list the following: (i); the later job; (ii) the given job; and (iii) a value (percentage) of the delay that can be decreased. The analysis will take care also of all the other jobs that presumably will run on the next time slot and affect also the SLA of the same later job (sometimes referred to herein as a "successor").

Finally, if a given job's SLA will not be satisfied under the provisional scheduling, then the analyzer block will put the given job on a "RED" list.

The two operations of a two operation algorithm performed by configurator block 404 will be respectively discussed in the following two paragraphs.

The first operation is checking for a postponement of a job. If there are jobs in the RED list, the configurator block creates a list of jobs that can interfere. Starting from this latest set of "interference" JOBS, the configurator block determines whether postponement of that JOB can solve the SLA issue. The analysis is done starting from the JOBS in the WHITE list having a relatively large percentage of possible delay (before going out of conformance with the WHITE-list job's SLA requirement(s)). If the configurator block is able to find a WHITE job that can be postponed without affecting its SLA, it will schedule it subsequently of the RED-list job, and so on with the other WHITE-list jobs until the SLA requirements of the RED-list jobs are satisfied.

If, after the analysis of WHITE jobs, it's still not able to satisfy the SLA of RED job, if will look against the "interference" jobs that are present on the yellow list (with higher percentage of delay). Based upon the previous algorithm, it will understand if it's possible to postpone a yellow job and not compromise the SLA. If such yellow job is found, it will be postponed. If after the analysis of YELLOW-list jobs, the configurator block is still not able to satisfy the SLA of the RED-list job, then the configurator block will pass to the second operation of the algorithm, specifically the check for modify logical group definition of the resources that will run a job, as will be described in detail in the following paragraph.

In the second operation, the configurator block checks for modifications to the logical group definition. This time it will start from the "interference" JOB, which is also referred to as the RED-list job. The configurator block uses a "what if analysis" to determine if outcomes will be better by modifying the existing logical group of resources or to schedule one job on another logical group. The analysis has the objective to satisfy the SLA of both jobs. If that analysis will not produce a result, then this second operation of the configurator block algorithm will take in consideration the YELLOW-list job(s) and then the WHITE-list jobs. A different analysis can be performed, starting instead from JOBS (independently on the list) that need fewer resources. In that case, the configurator block redefines the logical group or schedules the job on another logical group with the minimal impact.

The lists (RED, YELLOW, WHITE) will be updated after every action taken on the schedule or resource allocation as the consequences of the above two operations of the configurator block algorithm. After the two above steps, the configuration block analyzes YELLOW-list jobs (starting from the one with lowest delay), in order to (if possible) increase the SLA satisfaction of the successors. The analysis will not take care of RED-list jobs. Therefore, the same two above operations of the configurator block algorithm will be performed against WHITE-list and YELLOW-list "interference" job(s).

Some embodiments of the present invention: (i) classify jobs in categories (for example, RED, WHITE, YELLOW, etc.), according to the risk of missing their respective SLAs; and (ii) prioritize the order of submission of the jobs to comply with the SLA. In this way, these embodiments provide a dynamic re-allocation of the pool of resources that will execute the job. This dynamic allocation will temporary replace the logical pool definition to remove, or at least delay, the SLA violation.

Figure 5:
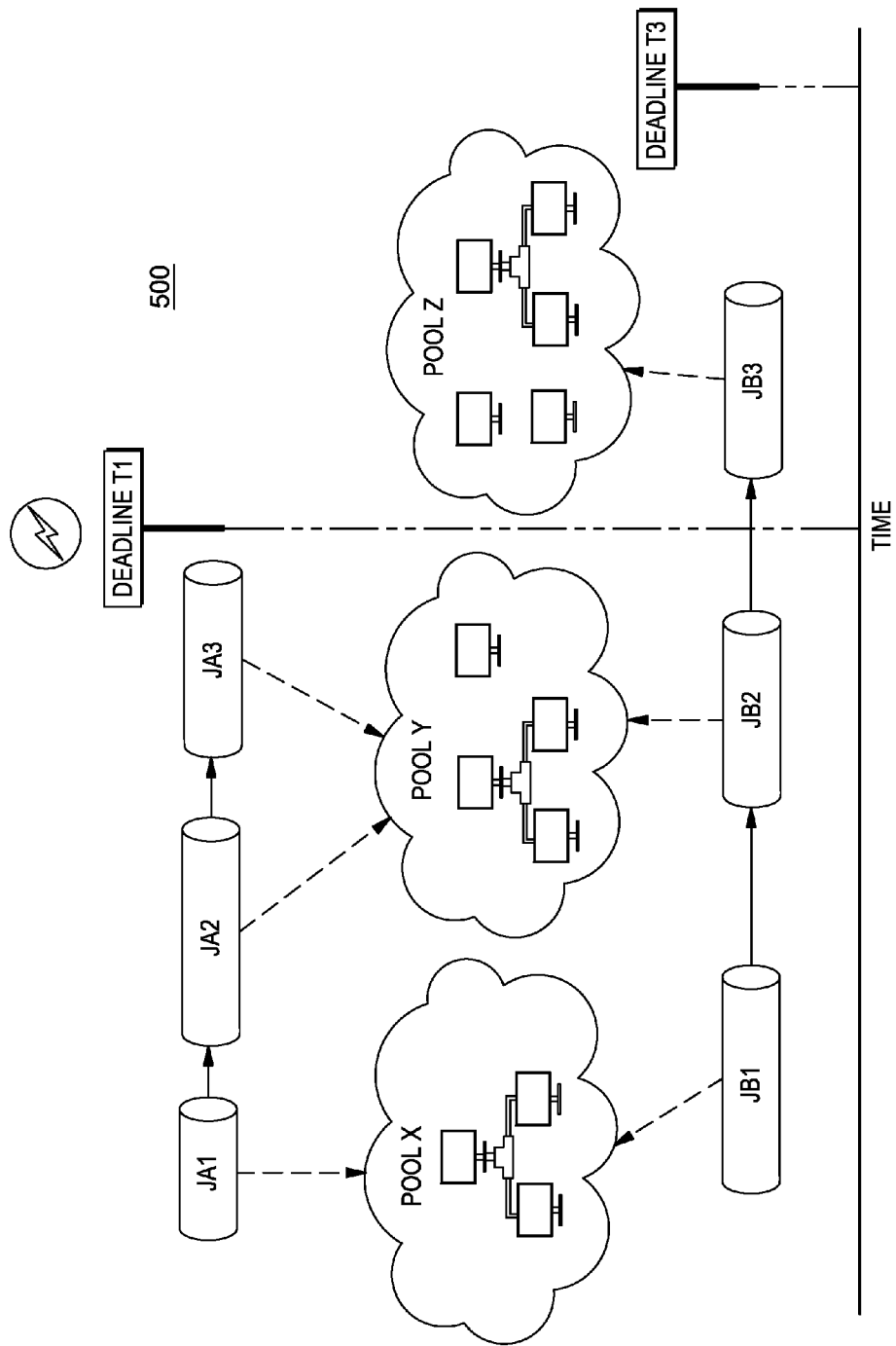
FIG. 5 is a timing diagram showing information that is generated by and/or helpful in understanding embodiments of the present invention.

As shown in FIG. 5, provisional scheduling timing diagram 500 provides an example of the method described in the previous paragraph. In diagram 500, job A3 (having an SLA deadline of T1) is in the RED list, while job B3 (having an SLA deadline of T3 is in the WHITE list). This is because Job A3 is provisionally scheduled in a manner that violates its applicable SLA, while job B3 is provisionally scheduled to comply with its respectively applicable SLA. As shown by arrows in diagram 500, jobs A3 and B3 are respectively, provisionally assigned to two different pools (as used herein, a pool is a predefined set of computational resources). This prospective SLA non-compliance will be resolved as explained in the following paragraph.

Figure 6:
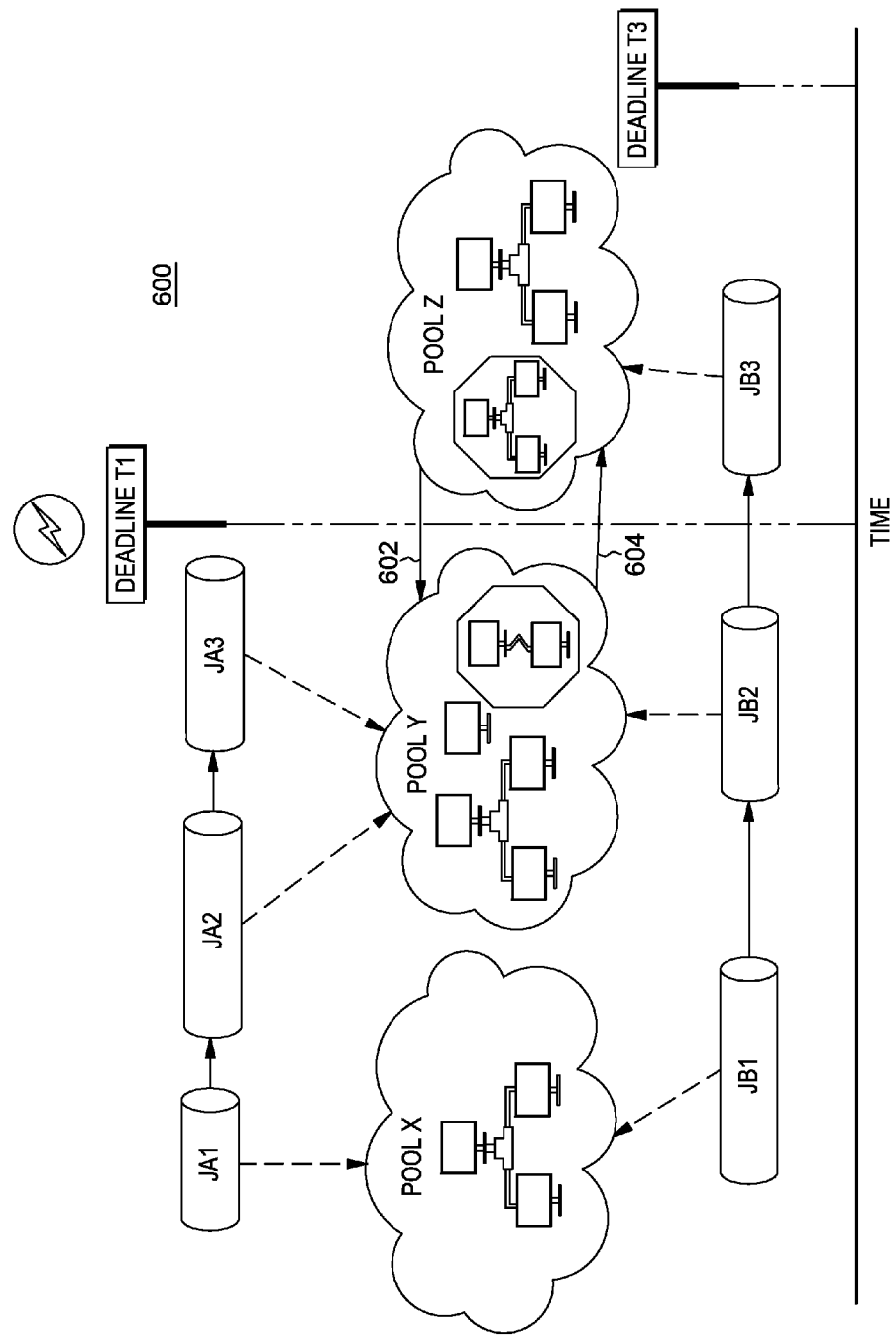
FIG. 6 is a timing diagram showing information that is generated by and/or helpful in understanding embodiments of the present invention.

As shown in FIG. 6, timing diagram 600 shows that just before job A3 starts, pool Z dynamically re-allocates some of its resources to pool Y. More specifically, this re-allocation of resources is shown by arrow 602. Because job A3 is performed by pool Y, this re-allocation of resources allows job A3 to be completed prior to its T1 deadline. Also, in this example, because pool Z is not being used by any jobs during the time interval that job A3 is performed by pool Y, it is especially clear that this re-allocation will not be problematic for any pool Z jobs. By the time job B3 starts, and it should be kept in mind that job B3 is a pool Z job, the "borrowed" resources of pool Z have been "returned" from pool Y to pool Z, as indicated by arrow 604. In this SLAs associated with both jobs A3 and B3 are met.

To go into the analysis of the previous paragraph in a bit more detail, for job B3 and its SLA-imposed deadline of T3, three scenarios could occur: (i) the T3 deadline for job B3 is satisfied simply returning the re-allocated resources from pool Y back to pool Z; (ii) the T3 deadline for job B3 will only be satisfied if pool Y returns the re-allocated resources and also lends pool Z additional resources above and beyond the ones that had been borrowed during the performance of job A3; or (iii) the A3 SLA is satisfied and the impact of violation is moved to the B3 SLA giving the administrator more time to react (despite of the fact pool Y is not able to lend sufficient resources to pool Z such that the T3 deadline for job B3 can be met). This approach can be iterated to multiple jobs, multiple pools and also according to a different embodiment to different plans that could have different not dependant SLAs.

Some embodiments provide complete independent plan(s) management and SLA(s) compliance. Independent plan means that the system is able to manage jobs and resources with a plan, but also within several plans, since several jobs belonging to different plans could run on the same machine.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer program product comprising a computer readable storage medium having stored thereon:
   first program instructions programmed to define a plurality of resource pools including a first pool and a second pool, where each resource pool has a plurality of assigned resources;
   second program instructions programmed to receive a plurality of jobs to be executed;
   third program instructions programmed to for each job of the plurality of jobs, assign a respective resource pool, of the plurality of resource pools, to be used in completing the job;
   fourth program instructions programmed to determine a preliminary schedule for executing the jobs on their respective resource pools;
   fifth program instructions programmed to determine whether the preliminary schedule is to cause any jobs to miss service level agreement (SLA) deadlines corresponding to the job;
   sixth program instructions programmed to execute the plurality of jobs on their respectively assigned resource pools;
   seventh program instructions programmed to on condition that a first job, of the plurality of jobs and assigned to the first resource pool, is to miss an associated SLA deadline under the preliminary schedule, re-assign first resource from the second pool to the first pool during at least some of the time of the execution of the first job by the first resource pool; and
   eighth program instructions programmed to, after the execution of the first job by the first resource pool, re-assign the first resource back to the second resource pool;
   wherein:
   the re-assignment of the first resource to the first pool occurs immediately before the execution of the first job; and
   the re-assignment of the first resource to the second pool occurs immediately after the execution of the first job.

2. A computer system comprising:
   a processor(s) set; and
   a computer readable storage medium;
   wherein:
   the processor set is structured, located, connected and/or programmed to run program instructions stored on the computer readable storage medium; and
   the program instructions include:
     first program instructions programmed to define a plurality of resource pools including a first pool and a second pool, where each resource pool has a plurality of assigned resources,
     second program instructions programmed to receive a plurality of jobs to be executed,
     third program instructions programmed to for each job of the plurality of jobs, assign a respective resource pool, of the plurality of resource pools, to be used in completing the job,
     fourth program instructions programmed to determine a preliminary schedule for executing the jobs on their respective resource pools,
     fifth program instructions programmed to determine whether the preliminary schedule is to cause any jobs to miss service level agreement (SLA) deadlines corresponding to the job,
     sixth program instructions programmed to execute the plurality of jobs on their respectively assigned resource pools,
     seventh program instructions programmed to on condition that a first job, of the plurality of jobs and assigned to the first resource pool, is to miss an associated SLA deadline under the preliminary schedule, re-assign first resource from the second pool to the first pool during at least some of the time of the execution of the first job by the first resource pool, and
     eighth program instructions programmed to, after the execution of the first job by the first resource pool, re-assign the first resource back to the second resource pool,
   wherein:
   the re-assignment of the first resource to the first pool occurs immediately before the execution of the first job; and
   the re-assignment of the first resource to the second pool occurs immediately after the execution of the first job.

* * * * *